UNITED STATES PATENT OFFICE.

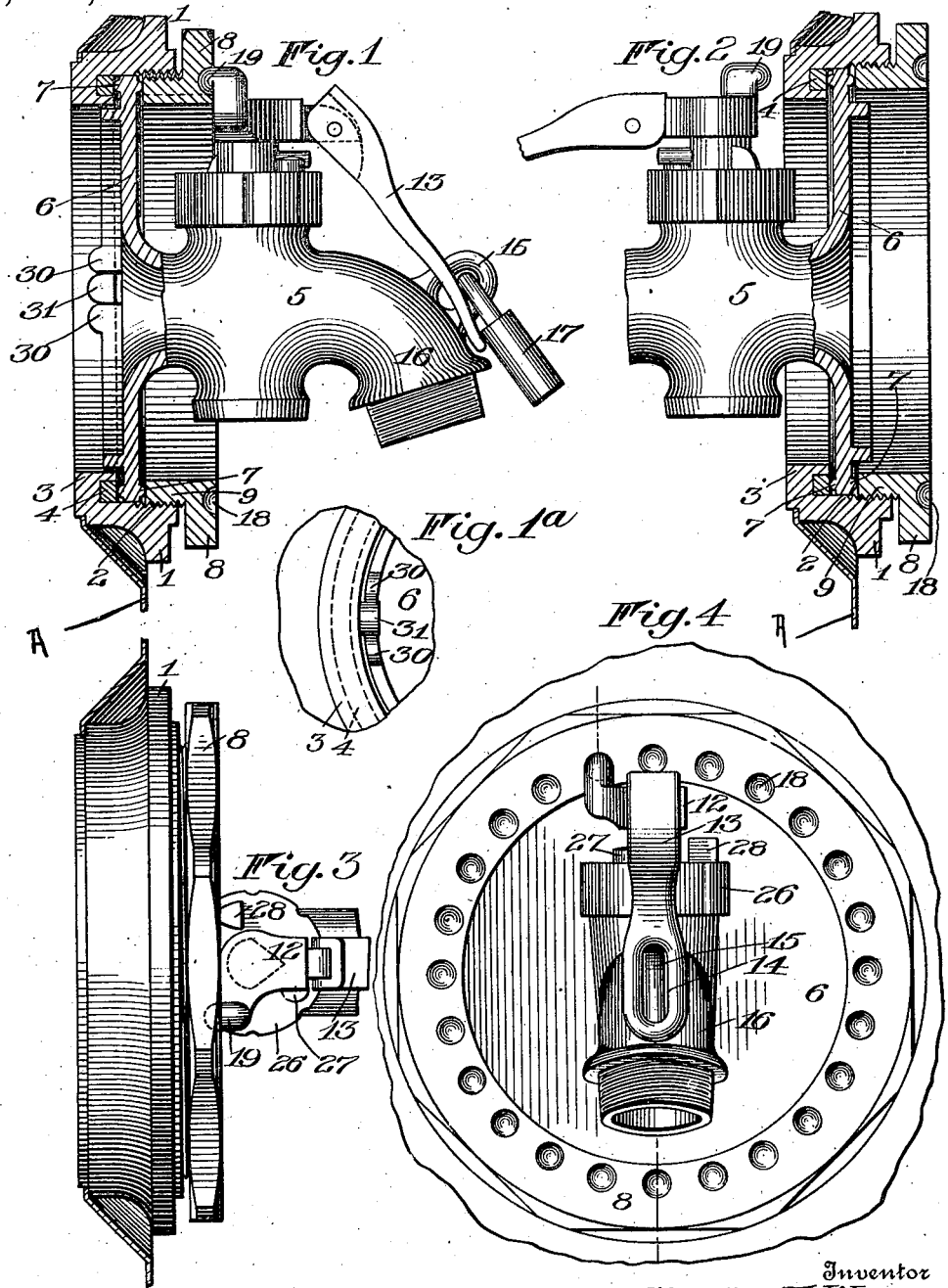

CHARLES F. WRAY, OF ROCHESTER, NEW YORK, ASSIGNOR TO NATIONAL BRASS MANUFACTURING COMPANY, OF ROCHESTER, NEW YORK.

FAUCET.

1,155,984.      Specification of Letters Patent.      Patented Oct. 5, 1915.

Application filed February 8, 1913. Serial No. 747,059.

*To all whom it may concern:*

Be it known that I, CHARLES F. WRAY, of Rochester, in the county of Monroe and State of New York, have invented certain new and useful Improvements in Faucets; and I do hereby declare the following to be a full, clear, and exact description of the same, reference being had to the accompanying drawings, forming a part of this specification, and to the reference-numerals marked thereon.

My present invention relates to improvements in faucets and it has for its object to provide a convenient means for removably supporting a faucet on a receptacle, such as a metal cask or tank, in such a manner as to permit it to be housed during shipment, while at the same time it may readily be secured in operative relation when the contents are to be drawn from the receptacle.

To these and other ends the invention consists in certain improvements and combinations of parts all as will be hereinafter more fully described, the novel features being pointed out in the claims at the end of the specification.

In the drawings; Figure 1 is a sectional view, partly in elevation, showing a portion of the wall of a tank provided with one embodiment of the invention, the faucet appearing in its operating position. Fig. 1ᵃ is a detail elevation; Fig. 2 is a similar view showing the faucet in reversed position, as when the tank is being shipped; Fig. 3 is a horizontal sectional view, showing the faucet and connecting parts in plan, and Fig. 4 is a front elevation.

Similar reference characters throughout the several views indicate the same parts.

In the present embodiment of my invention, A designates the wall of a metal tank such as is generally used for transporting oils and other liquids where it is desirable to provide a faucet that may be housed and protected until the liquid is to be drawn off, at which time the faucet can be quickly attached for operation, it being carried at all times on the cask. To this end, a seat or fitting 1 is provided which may be attached in suitable manner to the cask and embodies an interior threaded wall 2 and a flange 3 at the base thereof, which is recessed to hold a suitable packing-ring 4.

5 designates the casing of the faucet which is mounted upon a supporting plate 6, the latter preferably formed integral with the casing and provided preferably on opposite sides with circumferentially extending ribs 7, disposed near the periphery of the supporting plate. The supporting plate 6 is held in position by means of a collar or nut 8 which has a threaded portion 9 arranged to engage the threaded wall 2. When the nut is tightened, its inner edge engages against the rib 7 on the outer face of the supporting plate 6, forcing the rib on the inner face of the support tightly into engagement with the packing ring 4 and thus affording a tight joint which is proof against leakage.

The faucet and its support can be readily reversed to occupy either one of the positions shown in Figs. 1 and 2. While being shipped, the faucet occupies the position shown in Fig. 2, being arranged within the cask, where it cannot be damaged or broken. When it is desired to draw the contents from the cask, the latter is arranged in such a position that the fitting 1 is on top, and the nut 8 is then removed, permitting the faucet supporting plate to be taken out and reversed, after which the nut is against tightened to hold the parts in operating position.

The faucet embodies a valve 10 which is mounted on a valve stem 11, to the upper end of which is attached a cap 12 to which the handle 13 is pivotally connected. The outer end of the pivoted handle 13 is provided with a slot or opening 14 which is adapted to engage an eye 15 formed on the spout 16, and 17 is a lock which may be employed to prevent unauthorized tampering with the faucet. When the handle 13 is locked, as shown in Fig. 1, it is desirable to render it impossible to remove the faucet from the cask, and to this end, the nut 8 is provided with a series of recesses 18, while the cap 12 carries an extension on which is mounted a projection 19 arranged to engage one of said recesses 18 when the valve is closed as shown in Figs. 1 and 4. The supporting plate 6 carries lugs 30 which engage opposite sides of a lug 31 on the seat, so that when the nut 8 is tightened to hold the faucet supporting plate in operating position, and the faucet handle is locked, the faucet cannot be moved. Under ordinary conditions, when it is desired to remove the faucet, the valve handle is turned to disengage the locking projection 19 from the nut 8, and the latter can then be readily turned. This structure prevents any one from removing the faucet except when the valve handle is unlocked.

I claim as my invention:

1. The combination with a receptacle of a faucet, a support on which the faucet is mounted, said support being removable from the receptacle and reversible thereon, means for securing the support in place, a valve, a handle connected to the valve, means for locking the handle against movement, and means coöperating with the valve for locking the support, against movement when the handle is locked.

2. The combination with a receptacle, of a faucet, a supporting plate on which the faucet is mounted, a seat secured in the receptacle and adapted to receive said plate, a nut for holding the plate in engagement with the seat, a valve, a handle connected to the valve, means for locking the handle against movement, and a locking member carried by the valve and coöperating with said nut to hold it against movement when the handle is locked.

3. The combination with a receptacle, of a faucet, a supporting plate on which the faucet is mounted, a seat secured in the receptacle and adapted to receive said plate, a nut engaging the seat for holding the plate in position, a rotary valve plug, the aforementioned nut having a series of openings or recesses on its outer face, and a locking member carried by the valve plug and adapted to engage the recesses in the nut when the valve is closed.

CHARLES F. WRAY.

Witnesses:
G. WILLARD RICH,
H. E. STONEBRAKER.